Aug. 9, 1960 F. H. RICHTERKESSING ET AL 2,948,443

GARMENT FINISHER

Filed May 23, 1956 5 Sheets-Sheet 1

INVENTORS
FRANK H. RICHTERKESSING
WILLIAM M. CISSELL
BY
W. E. Sherwood
ATTORNEY

INVENTORS
FRANK H. RICHTERKESSING
WILLIAM M. CISSELL
BY
W. E. Sherwood
ATTORNEY

Aug. 9, 1960 F. H. RICHTERKESSING ET AL 2,948,443

GARMENT FINISHER

Filed May 23, 1956 5 Sheets-Sheet 3

INVENTORS
FRANK H. RICHTERKESSING
WILLIAM M. CISSELL
BY W. E. Sherwood
ATTORNEY

Aug. 9, 1960 F. H. RICHTERKESSING ET AL 2,948,443

GARMENT FINISHER

Filed May 23, 1956 5 Sheets-Sheet 4

INVENTORS
FRANK H. RICHTERKESSING
WILLIAM M. CISSELL
BY W. E. Sherwood
ATTORNEY

INVENTORS
FRANK H. RICHTERKESSING
WILLIAM M. CISSELL
BY W. E. Sherwood
ATTORNEY 2,948,443

GARMENT FINISHER

Frank H. Richterkessing and William M. Cissell, Louisville, Ky., assignors to W. M. Cissell Manufacturing Company, Louisville, Ky., a corporation of Kentucky Filed May 23, 1956, Ser. No. 586,710
9 Claims. (Cl. 223—67)

This invention relates generally to garment finishers and more specifically to an improved finisher for processing a wide range of sizes and types of garments. In particular, it relates to a finisher having its cooperating elements so arranged as to reduce the time required of the operator in conducting the cycle of fitting the garment on the apparatus, in performing the finishing treatment, and in removing the finished garment.

In certain types of finishers heretofore employed, the operator has been required to remain at a fixed station during the entire cycle of operation. In contrast therewith, our invention makes it possible for a single operator to conduct operations on two finishers simultaneously during at least a portion of the time required in processing two garments. For example, one garment may be receiving its finishing treatment while a second garment is being fitted on or removed from a companion apparatus.

One object of the invention is to eliminate foot pedals, so that all operations may be performed by the hands of the operator, and thus contribute to increased production through the elimination of the fatigue encountered when the operator is required to stand on one foot in order to perform certain operations with the other foot.

An object of the invention is to provide an improved finisher having a selectively distendable bag supported in such a fashion as to permit a garment to be quickly fitted on or removed from the bag.

Another object is to provide an improved finisher having a distendable bag provided with one or more readily operable means for selectively limiting the maximum size of the bag at one or more peripheries thereof.

Another object is to provide an improved finisher having means for readily adjusting the shoulder dimensions of a distendable bag.

Another object is to provide an improved means for clamping a garment to a finisher bag and form.

Another object is to provide an improved form for supporting a finisher bag.

Another object is to provide an improved perforated form and recessed clamp cooperating therewith for insuring a substantially uniform contact of processing fluids with a garment while clamped in position.

A further object is to provide an improved draw cable means for selectively adjusting the size of a finisher bag and for locking the cable means at a selected adjustment.

Still another object is to provide an improved arrangement of a plurality of hand operated controls of a finisher in order to establish a single operating station at which the operator may rapidly perform the cycle of finishing operations.

Other objects and advantages will become apparent as the description proceeds and when considered in conjunction with the accompanying drawings in which.

In carrying out our invention, we prefer to employ a removable inner form comprising perforated members arranged in a stable truss construction and which is mounted for rotary movement upon a bearing surface supplied by a stationary base assembly. The form is encased in a distendable bag, such as nylon, or the like, which is pervious to steam and air. These processing fluids are supplied in a selectively timed sequence from supply sources within the stationary base assembly. Draw cables for selecting the size which the distendable bag is to acquire for finishing a particular garment, are mounted upon the rotatable form, as are recessed clamp means for holding the garment to the form whenever this is desired. In addition, the actuating control of an automatic timer for regulating the flow of the processing fluid, is mounted upon the stationary base assembly closely adjacent the normal position of the draw cable actuating members.

Figures 1, 2, 3, 4, 5, 6, 7, 8, 9:
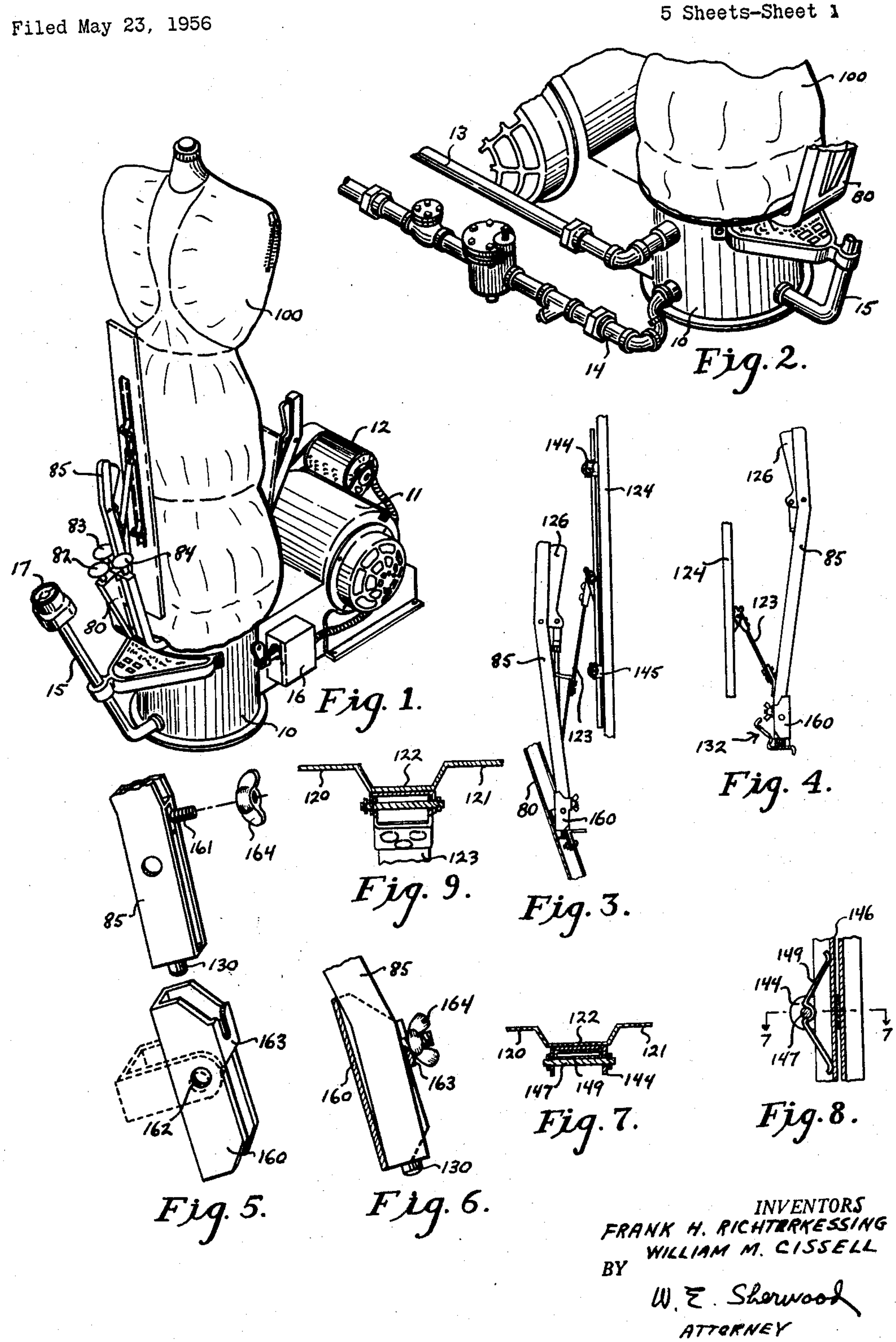
Fig. 1 is a perspective view of the garment finisher with the bag in position.
Fig. 2 is a perspective view of a lower portion of the finisher showing steam connections.
Fig. 3 is a side elevation view of a vertically adjustable, readily removable front clamp for employment with various sizes of garments.
Fig. 4 is a side elevation of a readily removable rear clamp.
Fig. 5 is a perspective view of an adaptor mounting for a clamp, the parts being shown in detached relation.
Fig. 6 is a view of the parts shown in Fig. 5 when assembled.
Fig. 7 is a sectional view of the adjustable slide of the front clamp, taken on line 7—7 of Fig. 8.
Fig. 8 is a vertical section view of the adjustable slide of the front clamp.
Fig. 9 is a sectional view of the mounting of a clamp upon a supporting spring leaf.

Referring first to Figs. 1 and 2, the base assembly includes a main housing 10 receiving a controlled flow of air from a blower 11 driven by a motor 12 through conventional belt and pulley means. A steam supply line 13 leads to a valved steam chamber and to heating coils within the base assembly. A steam return line 14 leads from the assembly and is provided with the customary valves and traps, as needed for a given installation.

A rigidly mounted, upwardly extending, hollow bracket 15 is disposed at one side of the base assembly and contains the control leads for regulating the operation of motor 12 and of a solenoid housed in box 16 on the main housing. As will later appear, the solenoid functions to regulate the flow of processing steam from the steam chamber into the interior of the finisher bag. A conventional hand-actuated, automatic timer 17 is preferably mounted at the extremity of bracket 15 and, as a significant feature of this invention, it is so located as to be adjacent the operating control knobs for the draw cables later to be described. It will be understood that, as an alternative, without departing from the invention, a remote control means for a timer located elsewhere may be mounted at the extremity of the bracket 15, and we so intend such a modification to be included within the spirit of the invention.

As a consequence of this arrangement, the operator can quickly actuate the timer control by hand and is not required to keep a foot on a pedal, or a hand on a control means, thus freeing him for additional duties while the automatic processing is occurring. Various hand-actuated, automatic timers now available may be employed and this invention is not limited to any particular form of timer. However, we prefer to employ an improved timer of the general type shown in the copending patent application of Frank H. Richterkessing, Serial No. 519,752, filed July 5, 1955, entitled Device for Controlling Electrically Operated Apparatus.

Figures 17, 18:
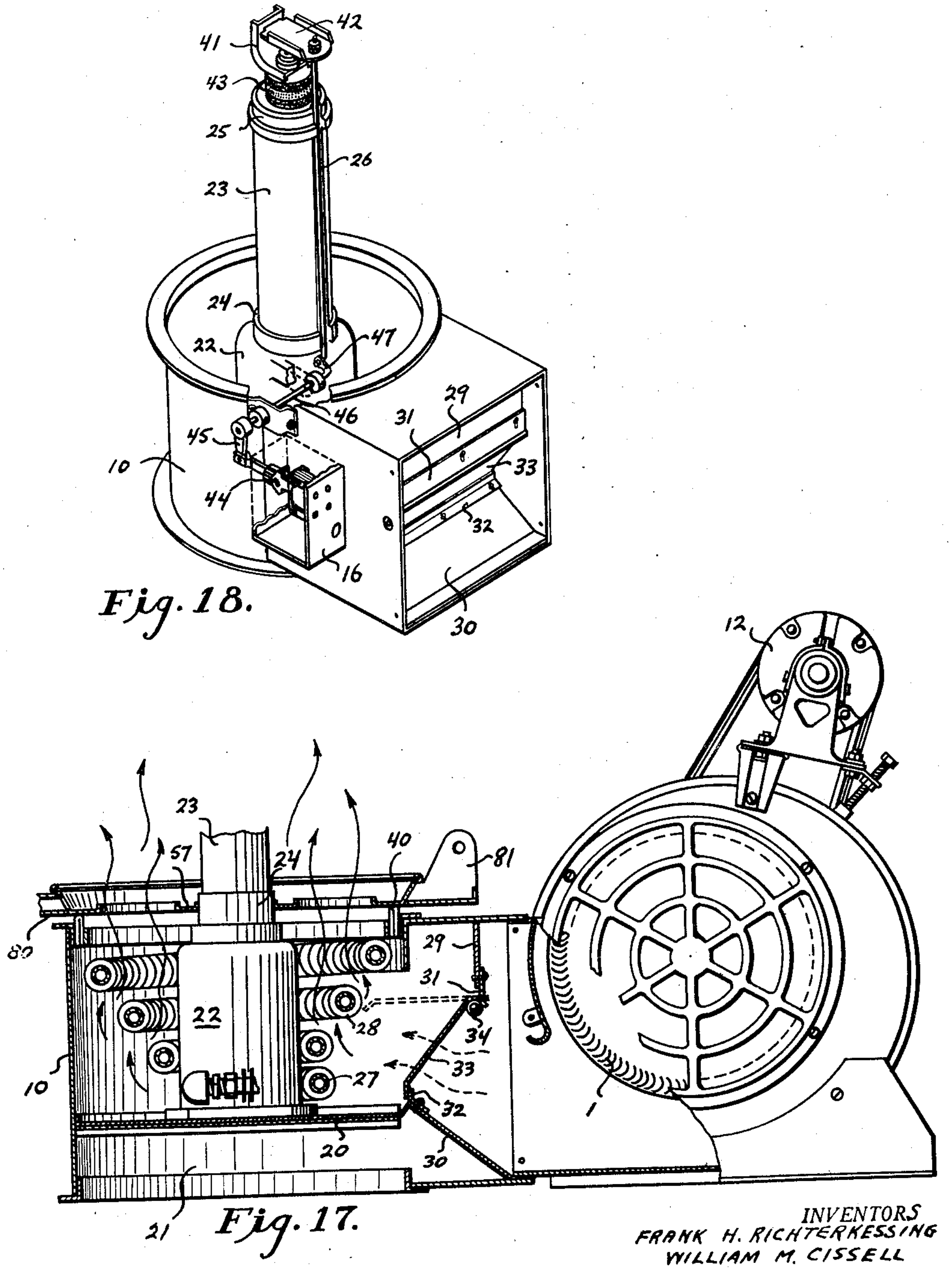
Fig. 17 is a partial sectional view of the base assembly.
Fig. 18 is a perspective view of a portion of the base assembly.

Referring now to Figs. 17 and 18, housing 10 is provided with a mounting plate 20 having an insulating open space 21 therebeneath and upon which the closed bottom of a vertically mounted steam chamber 22 is adapted to rest. Extending upwardly is a tubular steam chamber conduit 23 having external collars 24 and 25. Each collar is suitably recessed to accommodate a valve actuating rod 26. Steam from line 13 enters the chamber 22 and likewise enters an inverted spiral shaped coil 27 connected to the chamber and having radiating fins 28. From the upper portion of the coil, steam returns to the outlet line 14. At one side the housing is provided with partitions 29 and 30 to which are attached adjustable air seal members 31 and 32, respectively. A damper 33 pivotally mounted on a transverse support 34 is in contact with these seals while in closed position as shown in Fig. 17 and is raised to the dotted line position under the pressure of the air from blower 11, whenever the motor 12 is operating. With the damper in closed position under the influence of gravity, its contact with the seals accordingly prevents escape of steam from the base portion of the housing 10.

At its top portion, housing 10 mounts a flexible sealing strip 40, preferably of circular shape and which is maintained in contact with the lower surface of the superimposed form and prevents leakage of air and steam at the base of that form. A bracket 41 at the top of the steam chamber pivotally mounts a valve lever 42 to which the upper end of rod 26 is attached. Movement of that rod downwardly displaces a spring biased valve, not shown, within the steam chamber conduit and permits release of steam through apertures surrounded by a conventional metallic steam spreader 43. Contained within box 16 is a solenoid 44 connected to a crank lever 45 on one end of shaft 46. At its other end, the shaft 46 is connected to a second crank lever 47 attached to the lower end of rod 26.

With the foregoing description in mind, the regulated supply of processing fluids to the interior of the finishing bag will be noted. Upon actuation of the automatic timer 17, the solenoid is energized to open the valve in the steam chamber and to permit steam to escape through spreader 43. Due to seals 31, 32 and 40 this steam can escape only through the pervious bag itself. At the end of the allotted time, the solenoid is made inoperative and the motor 12 is energized, thus causing the blower to force air against damper 33 which lifts and permits the air to pass over the heating coils and into the bag. After the motor is cut off, the damper drops back to closed position without requiring any effort on the part of the operator. It will be understood that even when motor 12 is inoperative, the steam coil 27 continues to radiate heat and that normal convection currents of air passing between the interior of the bag and the sealed interior of housing 10 exert a drying action within the structure. Accordingly, the collection of undesirable accumulations of condensed steam therein is obviated.

Figures 10, 11, 12:
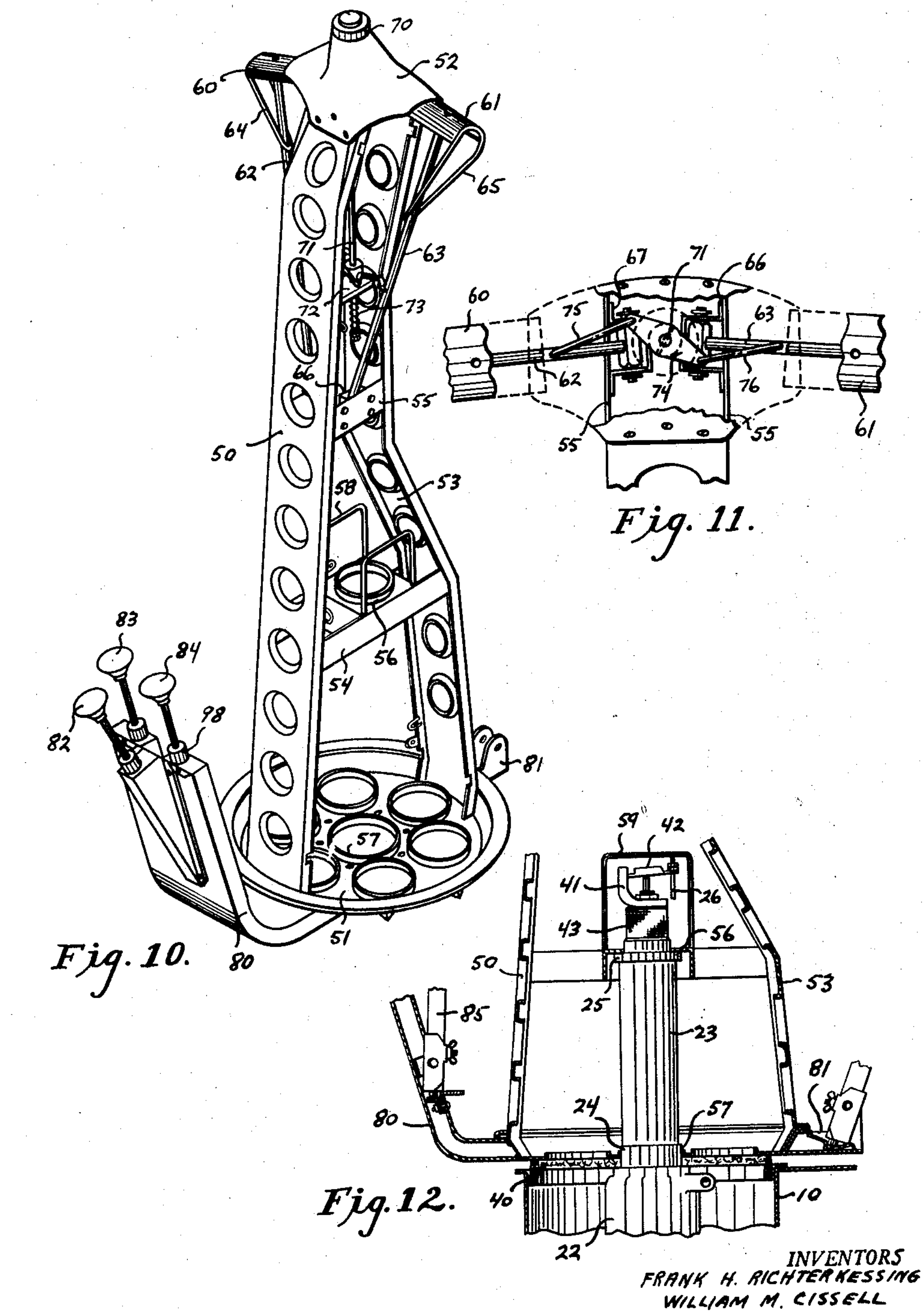
Fig. 10 is a perspective view of the bag supporting form detached from the base assembly and with the bag removed.
Fig. 11 is a plan view of the shoulder arm swivel means.
Fig. 12 is a sectional view of a portion of the base assembly and form showing the mounting arrangement.
Figure 22:
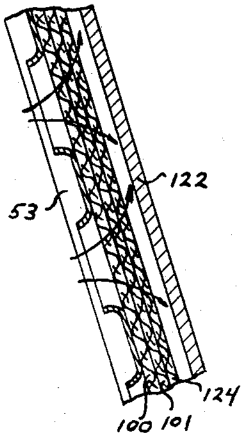
Fig. 22 is a view showing the flow of processing fluids through the clamped region of a garment, the bag and garment being shown to an exaggerated scale.

Passing now to Figs. 10 and 11, the improved form for supporting the finishing bag preferably includes an elongated front support member 50 extending from a generally circular perforated bottom plate 51 to a shoulder form section 52. A rear support member 53 likewise extends between the bottom plate and shoulder form, but preferably does not lie in a single plane, being offset toward the axis of the form in the central region thereof. An unobstructed space, therefore, is provided in this central region thereby permitting smaller garments to be finished upon the same form as much larger garments. In addition, the offset structure facilitates the fitting of a garment upon, as well as its removal from, the bag. As a significant feature, the support members 50 and 53 are provided with a row of apertures through which processing fluids may pass into recessed clamps, as shown in Fig. 22, and have flat surfaces on each side of the apertures against which the resilient edges of the clamps may be pressed to insure a tight grip upon a garment.

Intermediate the front and rear members and fixed thereto, a main cross member 54 and a smaller cross member 55 are disposed, thus serving to establish a stable truss-like construction for the form. At a central location, the main cross member has a cup-like bearing 56 (Fig. 12) which fits upon the upper bearing surface of collar 25 and permits rotary motion of the form with respect to the base assembly. At a central location the bottom plate 51 is formed with a bushing 57 which surrounds the lower collar 24 and gives lateral stability to the rotatable form. It will be seen that the entire form, therefore, may be lifted from the engagement with the base assembly and removed thereform, as when maintenance or adjustment requirements so dictate. In general, we prefer to make the form structure of stainless steel, although if desired, various portions, such as the shoulder form, 52, may be made of aluminum. A suitable lubricant such as a heat stable silicon material may be periodically applied to the collars 24 and 25 after lint or other foreign matter is removed therefrom. The form as thus mounted is dynamically balanced and may be rotated with little effort from the operator's position, but its weight prevents accidental rotational which might contribute to lost motion by the operator.

A suitable framework 58 is mounted upon cross member 54 and a porous steam baffle 59, such as a small asbestos bag, may be readily hung thereover, in enveloping rotation to the steam distributor 43. This baffle serves to prevent globules of condensed steam from being forced outwardly into contact with the finisher bag.

The invention provides an improved means for selectively adjusting the dimensions of the shoulder form section whereby the operator may effect such adjustment by a simple rotation of a knob rather than by pressing or pulling upon a lever. This means is more fully disclosed in the copending divisional application of Frank H. Richterkessing, Serial No. 820,528, filed June 15, 1959. As seen in Figs. 10 and 11, a pair of shoulder arms 60 and 61 are disposed for reciprocating movement with respect to the shoulder form 52. These arms are mounted respectively upon pivotal rods 62 and 63 and have looped garment guides 64 and 65 respectively. These guides are fixed at a lower end to their respective rods and at their upper ends to the entire exposed end of their respective shoulder arms. Accordingly, as a garment is removed from the collapsed finisher bag, no portion of the garment can engage the shoulder arms and thus no wrinkles are caused during this garment removal step. Moreover, the operator is not required to remove the garment slowly in order to prevent snagging of the same on the shoulder form.

The rods 62 and 63 are pivotally mounted at their lower ends in brackets 66 and 67 disposed upon the cross member 55 of the form (Fig. 11). At its uppermost position exterior of the finisher bag, the shoulder form has a rotatable knob 70 to which is attached a rod 71 extending downwardly through a mounting plate 72 located between the front and rear support members of the form. A suitable spring 73 disposed between the plate and the end of the rod serves to prevent inadvertent shifting of the shoulder arms. It is contemplated that when the garment finisher is employed for treating numerous garments of the same size successively a series of detents (not shown) will be provided for knob 70 so that fitting and removal of garments will not disturb the dimension of the shoulder form after the knob is engaged with a selected detent.

Adjacent plate 72 the rod 71 has a swivel arm 74 attached thereto near its center and connected to shoulder links 75 and 76 at its respective ends. The outer ends of these links are connected to the pivotal rods 62 and 63 at a point intermediate the ends of these rods. Accordingly, rotation of knob 70 in a clockwise direction, for example, decreases the width of the adjustable shoulder form and rotation in a counter-clockwise direction increases that width. At the front side of the form an upstanding draw cable mounting framework 80 is rigidly mounted adjacent the bottom member 51. At the rear side a mounting bracket 81 for a rear clamp is provided. The framework preferably serves to mount three draw cable control knobs 82, 83 and 84, later to be described, and is provided with a suitable recess into which the lever 85 of a front clamp may be conveniently housed. Location of these manually actuated control knobs and lever in a closely spaced cluster at the optimum height for ready reach, further serves to reduce the time and exertion required by the operator in carrying out a cycle of finishing a garment.

Figures 13, 14, 15, 16:
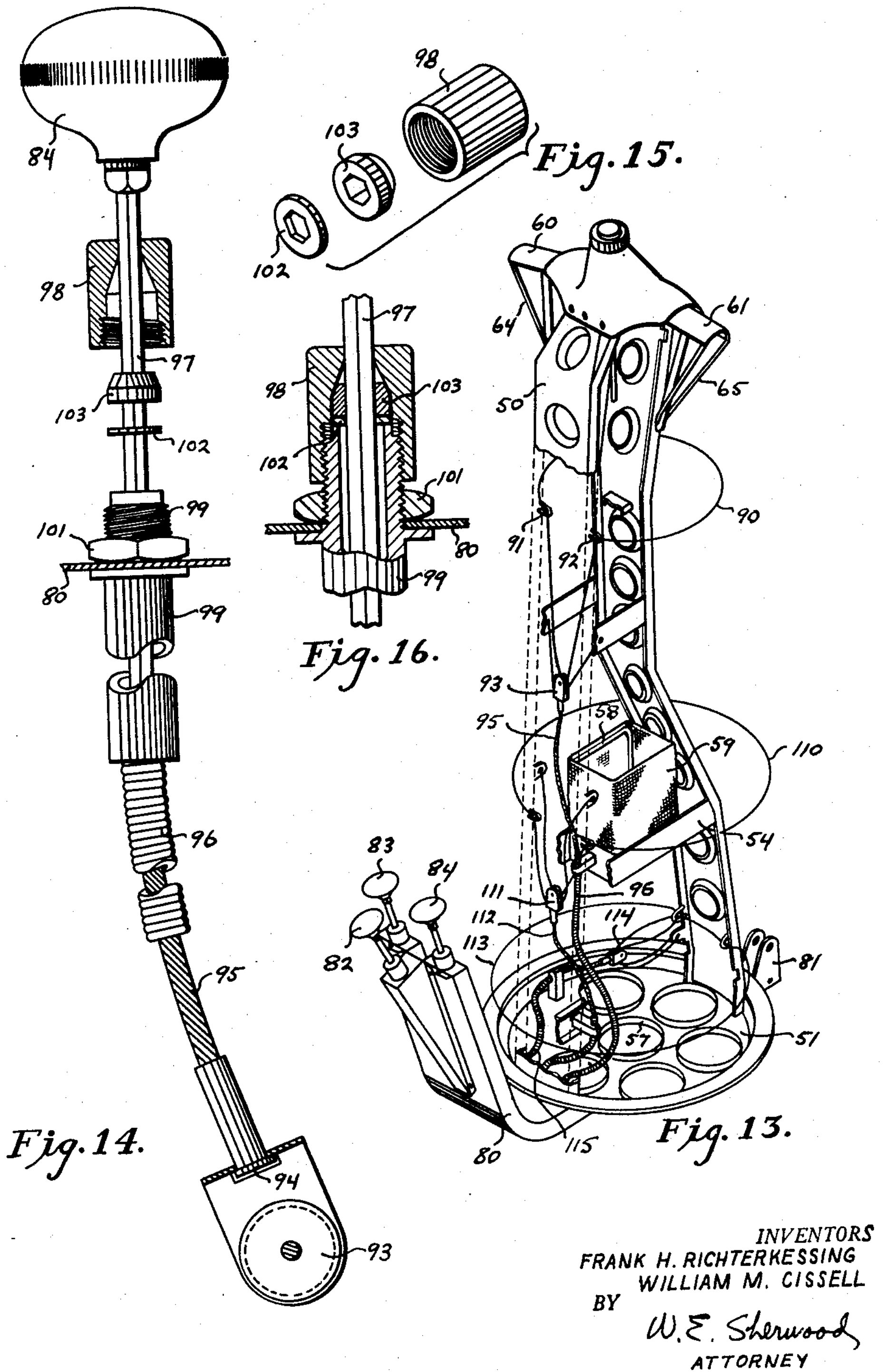
Fig. 13 is a perspective view of the form showing the draw cable mounting for selectively adjusting the size of the distendable bag.
Fig. 14 is a view partly in section of the improved draw cable and associated parts.
Fig. 15 is a view showing the relation of the draw cable locking means in disassembled position.
Fig. 16 is a sectional view showing the position of the draw cable locking means in assembled position.

Reference now is made to Fig. 13 wherein a significant feature of the invention is disclosed. As is known, the finisher bag is required to be selectively adjustable in size if garments of a wide range of size are to be processed on a given apparatus. The use of draw cables for carrying out this objective has been proposed by others but so far as known has been attended by various difficulties which it is a purpose of this invention to overcome. For example, the positive locking and later unlocking of such cables may take the operator some time to accomplish; the cables may become twisted or they may become loose due to inadequate anchoring. We overcome these and other difficulties by supporting the finisher bag upon a bag size adjusting means including a first flexible wire 90, termed a waist wire and mounted at a suitable upper location on the form structure. It will be understood that this wire, as well as the others to be described, is threaded through a peripheral cloth guide (not shown) in the interior of the finisher bag 100. The wire is passed through suitable eyelets 91 and 92 mounted on the front support member 50 and is threaded through the double pulley 93. One end of the wire is anchored to the form on one side of that pulley and the other end is anchored to the form at the other side of the pulley. Movement of the pulley upwardly or downwardly serves to increase or decrease the periphery of the bag at the region where the wire is affixed. Since the wire is slidably attached to the bag, processing fluid entering the bag under superatmospheric pressure distends the bag, and the garment fitted thereon, to the extent permitted by the position of the wire.

Beneath pulley 93, a suitable lost motion device, such as swivel 94, connects with a flexible push-pull cable 95 (Fig. 14) encased in a guide casing 96 suitably mounted on the form structure. The entire cable is thus mounted upon a unitary structure and terminates in the waist control knob 84. Since it is important to lock the cable in position after having made an adjustment of the bag size and yet to be able to make a subsequent adjustment without undue loss of time, we provide an improved cable locking means as shown in Figs. 14 to 16. For this purpose, the control knob is attached to a slide rod 97 having a non-circular cross section. This rod extends through a clutch nut 98 which is threaded upon sleeve 99 held in place upon the top of framework 80 by a plate lock nut 101. A metal clutch washer 102 backed by a resilient bushing 103, such as a nylon material, is disposed between the clutch nut 98 and the threaded sleeve 99. The apertures in clutch nut 98 and in metal washer 102, through which the rod 97 extends, conform in cross section to the cross sectional shape of the rod, so that they rotate together. Accordingly, when the wire 90 is adjusted to a desired periphery, turning of knob 84 through about 90–180° locks the draw cable in position and when it is desired to readjust the wire 90, turning the knob in a reverse direction the same amount releases the pressure of the clutch nut and permits the knob and attached cable to be pushed or pulled through the nut 98. The swivel 94, of course, permits this locking and unlocking action to occur without causing a turning of pulley 93 and a kinking of the wire attached thereto. Experience has shown that the resilient bushing must be interposed between the clutch washer and the clutch nut 98 rather than between the washer and sleeve 99, since in the latter arrangement an excessive locking action contributing to lost time of the operator is likely to occur.

In a similar manner, a bag adjusting means including a wire 110, termed a hip control wire, is slidably attached to the finisher bag 100 and through pulley 111 is operated by draw cable 112, terminating in control knob 82. Likewise, a bag adjusting means including wire 113, termed a lower control wire, is slidably attached to the bag and through pulley 114 is operated by draw cable 115 terminating in control knob 83.

Figure 19:
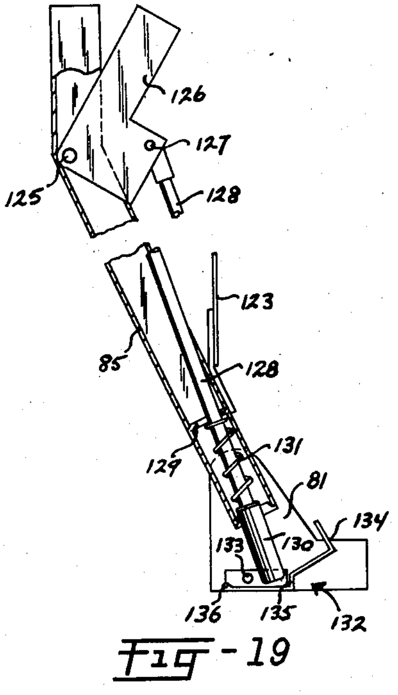
Fig. 19 is a view to a larger scale showing the mounting and actuating means for the rear clamp without use of an adaptor.

As is customary in finishing buttoned garments, or garments having vents therein, it is desirable, if not essential, that means be provided to clamp the garment to the distended bag during the operation. For the purpose of clamping the rear of the garment, such as a vented overcoat, we employ an improved three position rear clamp, best shown in Figs. 4 and 19. This clamping means is more fully disclosed in the copending divisional application of Frank H. Richterkessing, Serial No. 811,668, filed May 7, 1959.

This clamp, as in the case of the front clamp, preferably comprises a resilient metal paddle, or the like, having parallel spaced side surfaces, 120 and 121 (Fig. 9) joined by a recessed central portion 122 and pivotally mounted by suitable brackets at the extremity of a leaf spring 123. The paddle is loosely covered by a suitable fabric 124, such as a twill which is pervious to the processing fluids. At its lower end, the leaf spring is mounted upon movable lever 85 which in turn is pivoted upon bracket 81. At its upper end, lever 85 has a transverse pin 125 upon which a handle 126 is pivotally mounted and is provided with a spaced pin 127 mounting the upper end of a latch rod 128 in a toggle-like arrangement. This rod extends downwardly through an aperture in partition 129, within the lever confines, and terminates in an enlarged latch engaging member 130. Between the partition and the upper surface of this member a compression spring 131 is mounted.

For convenience in manufacturing and interchangeability the actuating means for both the front and rear clamps, as thus described, are preferably identical and the same references are accordingly applied to both structures. However, as an improved feature of our invention, the rear clamp is provided with a special latch means permitting three separate locations of the clamp. This latch may include a member 132 pinned at 133 to bracket 81 and having a first limiting stop 134, a second limiting stop 135, and a third limiting stop 136. In operation, as when finishing a generally tubular garment, such as a dress without vents near the hem, it is desirable to have the rear clamp completely out of the way in order to contribute to a prompt fitting and removal of the garment with respect to the bag. In this case, the operator may rapidly retract handle 126 and move the member 130 into engagement with the first stop 134, whereupon the clamp is retracted a substantial distance from the bag and form. In finishing a vented garment, such as an overcoat, the handle may initially rest in the position shown in Fig. 19, whereupon the hem of the coat falls between the clamp and form without snagging upon the clamp. With the garment in position, the operator may then retract handle 126 and push the lever 85 forward, meanwhile permitting member 130 to engage at the left of stop 136. During this action, leaf spring 123 is flexed causing the clamp to be held resiliently against the bag and form member 53.

Referring to Fig. 22, in the case of both front and rear clamps, the recessed central portion 122 of the clamps permits processing fluids to pass through the apertures of the form support members, through the bag 100, the garment 101, and the clamp fabric 124, and to diffuse upwardly and downwardly through the recess in the clamp. In this way, substantially all of the clamped portion of the garment receives the same finishing treatment as the unclamped portion of the same garment.

Figure 20:
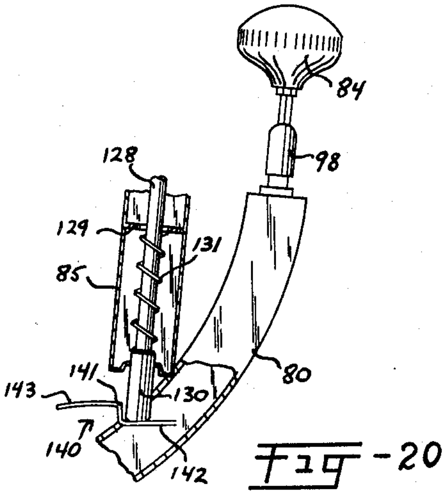
Fig. 20 is a detail view showing the mounting of the actuating means for the front clamp without use of an adaptor.

With respect to the front clamp, we prefer to employ a two position latch 140 mounted upon framework 80, as shown in Fig. 20, and having a limiting stop 141 and forward and rearward guide surfaces 142 and 143, respectively. In finishing a buttoned coat for example, the operator places the coat in position on the bag with the proper setting of the shoulder arms and then retracts handle 126 and pushes lever 85 forward until member 130 engages upon surface 142 to the right of stop 141, as shown in Fig. 20. At this time the leaf spring of the front clamp is flexed holding the clamp against the front support member 50 of the form. On the contrary, when member 130 is disengaged from stop 141, it may assume the latched second position by bearing upon the surface 143 and at this time the clamp is out of contact with the form.

Figure 21:
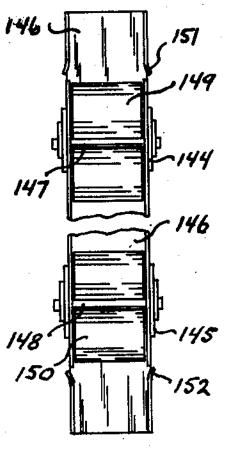
Fig. 21 is an elevation view showing the means for limiting the travel of the adjustable slides of the front clamp.

As a significant feature, the front clamp, in contrast to the rear clamp, is made longitudinally adjustable in order to permit a wide range of sizes and types of garments to be processed on the same finisher and without causing undesirable creases in coat lapels for example. As seen in Figs. 3, 7, 8 and 21, the front clamp comprises an elongated paddle with side surfaces 120 and 121 joined by the recessed central position 122 and carrying a pair of upper and lower brackets 144 and 145, respectively. A clamp slide 146 is pivotally attached to the upper end of leaf spring 123 and each of brackets 144 and 145 is provided with a suitable abutment rod 147 and 148, respectively. Bearing against these abutment rods are resilient slide clips 149 and 150, respectively, having sufficient compression strength to hold the front clamp at the selected position with respect to the clamp slide. It is to be understood that the operator, upon observing the size of garment to be finished, will normally slide the front clamp upwardly or downwardly on the clamp slide to a selected position, prior to operating the lever 85. For the purpose of limiting the maximum range of movement of the clamp, the slide is provided with suitable obstructions 151 and 152 to the movement of the clamp. Preferably, these obstructions comprise outwardly extending portions of the clamp slide against which the brackets on the clamp may abut (as shown in Fig. 21).

To enhance the adaptability of our finisher to use in large commercial establishments in which a large number of garments of the same type requiring no rear, or front clamp, or either clamp, is needed, we provide means for quickly removing or attaching these clamps to the form. As noted in Figs. 3 and 4, either of the front and rear clamps may have lever 85 mounted in a special adaptor 160 rather than being mounted directly upon framework 80 or bracket 81. In this modification, the lever 85 may have a threaded bolt 161 (Fig. 5) extending outwardly from the region of the partition through which the rod is passed. The hollow adaptor 160 is pivotally mounted by means of a bolt passing through aperture 162 and extending into the walls of the appropriate framework 80 or bracket 81. Near its upper portion, the adaptor has a slotted cover 163 for receiving bolt 161, the latch engaging member 130 meanwhile extending below the lower extremity of adaptor. A simple wing nut 164 engaging with bolt 161 exteriorly of cover 163 serves to permit rapid engagement or disengagement of the lever 85. Since this lever mounts the entire clamp, it will be seen that the finisher may be quickly modified by adding or removing the clamps as desired.

With the foregoing description in mind, the installation of the apparatus for carrying out the objectives of this invention will be readily apparent. After placing the form upon the base assembly, the bag 100 is draped over the form with its inner canvas jacket (not shown) centered upon the shoulder form. This jacket serves to reduce somewhat the pervious character of the bag in the region above the waist draw cable and contributes to the efficient distribution of the processing fluids. The waist, hip and lower draw cables are arranged in position in turn and the lower edge of the bag is then fastened over the rim of the bottom member 51 by means of a draw string. Thereafter, any processing fluids entering the thus mounted distendable bag pass outwardly through the bag and the garment fitted thereon and the pressure exerted by such fluids can distend the bag and garment only to the extent permitted by the above-described bag size adjusting means and clamps. Accordingly, a high quality of finishing and a fast production rate is accomplished by means of the apparatus. Bag 100, moreover, is provided with conventional zippers opening beneath the shoulder arms, so that the processing fluids may pass outwardly into the sleeves of garments which in turn may be held in separated condition by means of conventional sleeve spreaders.

While we have shown a particular embodiment of the invention, it will be understood, of course, that we do not wish to be limited thereto since many modifications may be made. We, therefore, contemplate by the appended claims to cover any such modifications as fall within the true spirit and scope of our invention.

What we claim as new and desire to secure by Letters Patent of the United States is:

1. In a garment finisher having an elongated fluid-pervious bag, an inner form for supporting said bag and comprising a front support member, a rear support member and a cross member rigidly joining said front and rear members intermediate the ends thereof, a bearing in said cross member, a base assembly for directing processing fluids into said bag and having a stationary fluid conduit extending into said form between said front and rear members said conduit including a valve mounted thereon for controllably releasing fluid therefrom, a rod mounted externally of said conduit and internally of said bearing for actuating said valve, and a bearing surface on said conduit in contact with the bearing in said cross member thereby to mount the form and bag upon said base assembly.

2. In a garment finisher having an elongated fluid-pervious bag, an inner form for supporting said bag and comprising a perforated bottom plate having a centrally disposed bushing, a front support member attached to said plate, a rear support member attached to said plate and a cross member rigidly joining said front and rear members intermediate the ends thereof and spaced from said plate, a bearing in said cross member, a base assembly for directing processing fluids into said bag and having a stationary fluid conduit extending through said bushing and into said form between said front and rear members, said conduit including a valve mounted thereon for controllably releasing fluid therefrom, a rod mounted externally of said conduit and internally of said bearing for actuating said valve, and a bearing surface on said conduit in contact with the bearing in said cross member thereby to mount the form and bag upon said base assembly.

3. In combination, a garment finisher having a selectively distendable, fluid-pervious bag, a stationary base assembly for directing processing fluids into said bag, a form supporting said bag and rotatably mounted on said assembly, a steam coil in said assembly, a blower for forcing a stream of air periodically across said coil and into said bag, a valve disposed interiorly of said form and above said base assembly for releasing steam into said bag, a hand-operated timer for automatically controlling the actuation of said blower and said steam valve in timed sequence and mounted upon said stationary assembly at an elevation requiring no substantial exertion by the operator in order to manipulate the same, and a draw cable for adjusting the periphery of said bag, said cable terminating in a hand-operated control means mounted upon said rotatable form at an elevation adapted to dispose said control means adjacent said timer when said form occupies its normal operating position.

4. In a garment finisher having an elongated fluid-pervious bag, a rotatable inner form for supporting said bag and comprising a front support member, a rear support member and a cross member rigidly joining said front and rear member intermediate the ends thereof, a bearing surface on said form for supporting said form, an apertured plate joining said front and rear member adjacent the lower ends thereof and having a central aperture in said plate, a base assembly for directing processing fluids into said bag and having a stationary fluid conduit extending through said central aperture and into said form between said front and rear members, said conduit including a valve mounted thereon adjacent the top of said conduit for controllably releasing fluid therefrom, means including a rod mounted externally of said conduit and internally of said central aperture in said plate for actuating said valve, and a bearing surface on said stationary conduit cooperating with the bearing surface on said rotatable form for supporting said form upon said base assembly.

5. Apparatus as defined in claim 4 including a bushing defining the central aperture in said plate and a collar projecting laterally from said stationary conduit and engaging with said bushing thereby to assist in maintaining lateral stability of said rotatable form.

6. A garment finisher comprising in combination, a form having a perforated bottom plate, a fluid-pervious bag supported upon said form, a stationary base assembly for directing processing fluids into said bag and including a conduit for releasably containing steam, means for rotatably mounting said form upon said conduit with said bottom plate spaced closely adjacent said base assembly, a steam coil in said assembly, a blower means in said assembly for periodically forcing a stream of air across said coil and through the perforated plate into the interior of said bag, an automatically operable pivoted damper means interposed between said blower means and said coil and adapted in a first position to permit passage of said stream of air and in a second position to close communication between said blower and coil, said damper means being mounted for movement to said first position under pressure of air from said blower means and for movement to said second position when said air pressure is diminished, means for periodically releasing steam from said conduit into the interior of said bag and an automatic timer for controlling the actuation of said blower means and said steam releasing means.

7. In a garment finisher having a selectively distendable fluid-pervious bag, a stationary base assembly for directing processing fluids into said bag, a form supporting said bag and rotatably mounted upon said assembly, a cable mounting framework attached to the lower end of said form and extending upwardly and outwardly of said bag, and a hand-operated reciprocable draw cable for adjusting the periphery of said bag, said draw cable being adjustably mounted upon said framework and terminating at one end in a first control means mounted externally of said bag and upon said framework at an elevation requiring no substantial operating exertion by the operator of the finisher during adjustment of said cable upon said framework and as the periphery of said bag is adjusted by said cable; the improvement comprising a second hand-operated control means comprising an automatic timer for regulating the flow of processing fluids into said bag, said second control means operating independently of the continued presence of said operator after being initially actuated by said operator, and stationary means mounting said second control means upon said base assembly out of the path of movement of said first control means as said form is rotated, said second control means occupying a position closely adjacent the normal operating position of said first control means upon said framework thereby to establish for the operator substantially a single operating station at which a plurality of hand-operated control movements may be rapidly performed.

8. Apparatus as defined in claim 6 including a steam releasing valve mounted interiorly of said conduit, a solenoid adapted to be energized by said timer, a rod mounted externally of said conduit and connected to said valve, and a linkage connecting the movable member of said solenoid to said rod.

9. Apparatus as defined in claim 3 including a cable mounting framework attached to the lower end of said form and extending upwardly and outwardly of said bag, said draw cable being rotatably and reciprocably adjustable upon said framework and being adapted for varying the periphery of said bag during reciprocable adjustment upon said framework and for movement into locked and unlocked positions during rotatable adjustment upon said framework.

References Cited in the file of this patent

UNITED STATES PATENTS

| | | |
|---|---|---|
| 2,338,776 | Miller | Jan. 11, 1944 |
| 2,361,045 | Miller | Oct. 24, 1944 |
| 2,378,565 | Locke et al. | June 19, 1945 |
| 2,412,172 | Pettit | Dec. 3, 1946 |
| 2,425,194 | Lendle | Aug. 5, 1947 |
| 2,436,731 | Richa | Feb. 24, 1948 |
| 2,454,977 | Richa et al. | Nov. 30, 1948 |
| 2,460,732 | Brenner et al. | Feb. 1, 1949 |
| 2,533,761 | Brenner et al. | Dec. 12, 1950 |
| 2,592,903 | Jackson | Apr. 15, 1952 |
| 2,606,272 | Platt | Aug. 5, 1952 |
| 2,689,996 | Glattes | Sept. 28, 1954 |
| 2,736,471 | Jackson | Feb. 28, 1956 |
| 2,805,009 | Jackson | Sept. 3, 1957 |